United States Patent Office 3,217,146
Patented Nov. 9, 1965

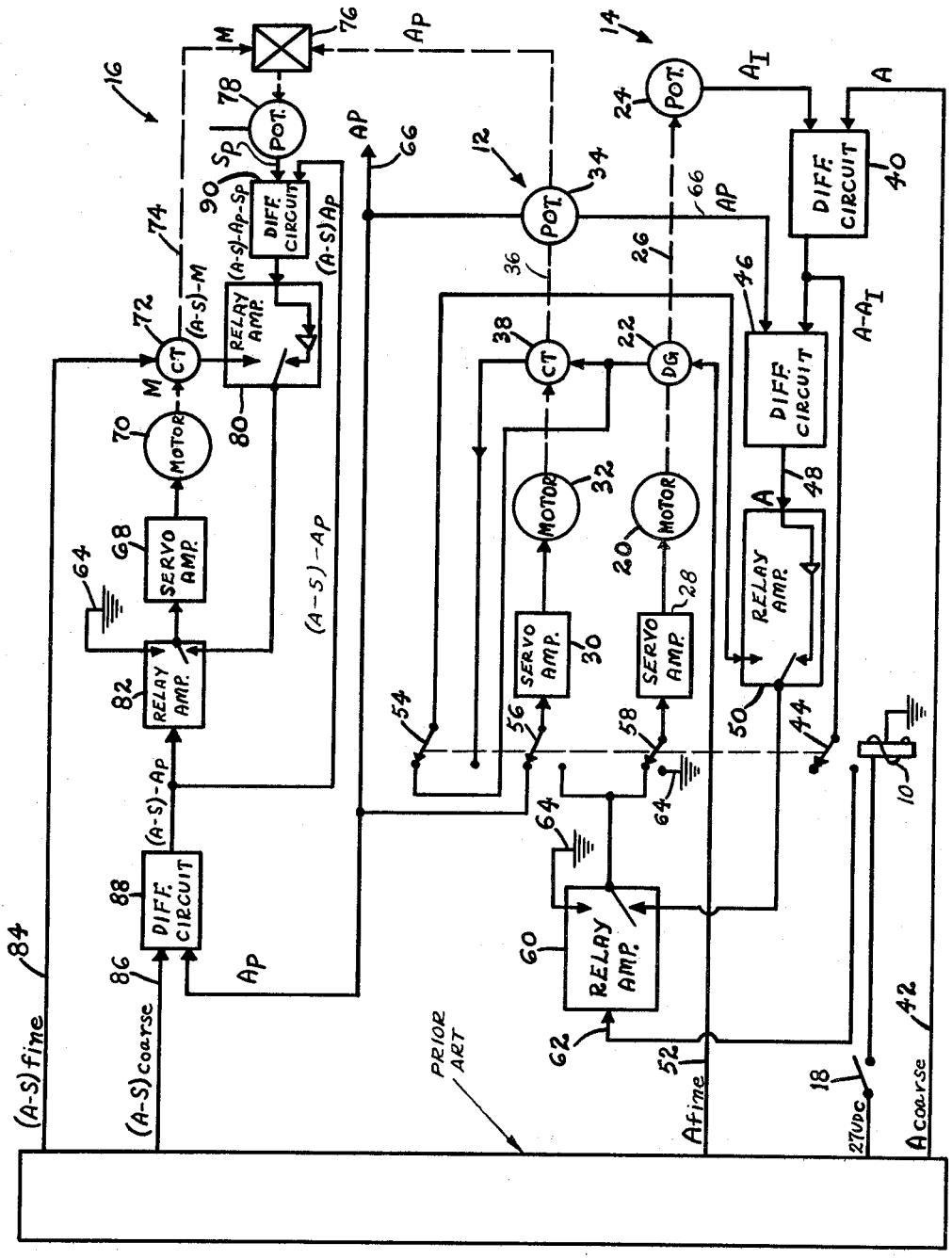

3,217,146
NAVIGATION COORDINATE PRESENTATION COMPUTER
Wesley A. Fails, Woodland Hills, Calif., assignor to the United States of America as represented by the Secretary of the Navy
Filed Sept. 30, 1960, Ser. No. 60,279
12 Claims. (Cl. 235—151)

This invention relates to computers and more particularly to computers that may be used to present tracking and navigation information.

The present application is one of a series of applications in which this application shows a system employing the subject matter of applications Serial No. 60,277 filed September 30, 1960, now Patent No. 3,121,845, and Serial No. 60,278 filed September 30, 1960, now abandoned, as component parts.

In military weapons systems it is frequently desirable to present a tracking vehicle's position (for instance an airplane's position) and the position of the object being tracked (for example a submarine) in relation to more than one set of reference coordinates. For instance, it is often desirable to show the airplane's position with respect to the submarine while at other times it is desirable to show both the airplane and submarine with respect to some external fixed coordinate.

To provide for changes in reference coordinates and at the same time obtain necessary range, accuracy and response requirements, the present invention employs a special purpose computer along with a more or less elaborate switching scheme.

The computer consists of three basic servo channels. Two of the servos are used to present the position of the tracking vehicle and object being tracked. These servos will be referred to as the aircraft and submarine presentation servos. The third servo is used to change the position of the reference coordinates. This servo will be referred to as the aircraft index servo.

The switching scheme used in conjunction with the servos performs several functions. One of these functions is to change the mode of operation of the system from one which the information from the presentation computers is referenced to the submarine to one in which the reference is external to both the submarine and aircraft. Another function is to provide the servos with quicker response, more accuracy and greater range that would otherwise be possible. The components used in this scheme are one common electromechanical relay, several amplifiers of the type disclosed in copending application, Serial No. 60,278, filed September 30, 1960, now abandoned, and several difference amplifiers of the type disclosed in copending application, Serial No. 60,277, filed September 30, 1960, now Patent No. 3,121,845.

Therefore, it is an object of the present invention to provide a tracking presentation computer wherein changes in references coordinates may be accomplished.

Another object is to provide a tracking presentation computer wherein such changes in reference coordinates may be accomplished smoothly and with great accuracy.

Still another object is to present such tracking information quickly and with great accuracy.

Other objects and many attendant advantages of this invention will be readily appreciated as the same becomes better understood by reference to the following detailed description when considered in connection with the accompanying drawing wherein the sole figure is a diagrammatic presentation showing the incorporation of the invention into one axis of a tracking presentation computer.

Referring to the drawing, it may be seen that the relay 10 couples the aircraft presentation servo 12 to the aircraft index servo 14 so that changes in the presentation of information for two different modes of operation may be obtained from the aircraft 12 and submarine 16 presentation servos by the opening and closing of a switch 18.

Information supplied to the presentation computer is in coarse (high gradient) and fine (low gradient) forms. Where such information is used in conjunction with a means to switch the input of a servo from one form to the other higher accuracy and quicker response are obtainable from that servo than would be possible if the information had been supplied at some intermediate gradient level.

By opening the switch 18 the presentation goes into its first mode of operation. In this mode of operation the position of the aircraft is presented referenced to the submarine. Thus, if the information were to be presented on the face of an oscilloscope, the submarine would be in the center of the tube and the aircraft would move around it. When the switch is closed the presentation computer presents the position of the submarine and the aircraft with respect to some external reference so that in a scope presentation the submarine and aircraft would be shown as moving in relation to one another and with respect to some third point at the center of the tube.

The aircraft index servo 14 consists of a motor 20 having a differential generator 22 and a potentiometer 24 mounted on its shaft 26; being driven by a servo amplifier 28. The aircraft presentation servo 12 is similarly composed. Like the index servo it has a servo amplifier 30 which drives a motor 32 having a potentiometer 34 mounted on its shaft 36. It differs from the index servo in that a control transformer 38 replaces the differential generator found on the index shaft.

The switching circuit connected to the aircraft index and presentation servos contains a difference circuit 40 for comparing the output of the index potentiometer 24 to coarse aircraft position information 42. The output of this first difference circuit is fed to an arm 44 of the relay 10 and into a second difference amplifier 46 along with the output of the aircraft presentation potentiometer 34. The output 48 of the second difference amplifier 44 is then fed to a fine coarse relay amplifier 50.

The differential generator 22 input is coupled to the fine aircraft position information 52. The output of the generator is fed to the aircraft presentation control transformer 38. The outputs of both the difference generator 22 and the control transformer 38 are coupled to terminals on the relay 10. An arm 54 of the relay feeds one or the other of these outputs to the fine-coarse relay amplifier 50 depending on the relays state.

The fine-coarse relay amplifier 50, of conventional design and operation, switches from the coarse difference circuit output 48, an error voltage, to one of the fine synchro outputs 54 when the difference circuits output 48 falls below some predetermined level. This coarse-fine control permits the servos to respond quickly to changes in aircraft position while preventing overshoot usually associated with high gain undamped servo mechanisms.

During the object reference mode of operation both the aircraft presentation servo 12 and the aircraft index servo 14 are in a follow-up mode of operation. The input 56 of the presentation servo is coupled to the output of the presentation potentiometer 34 so that the motor 32 will drive the potentiometer 34 to null. The input 58 to the index servo amplifier 28 is coupled to the output of the fine-coarse relay amplifier 50 through a second relay amplifier 60 which performs no switching function because its activating input 62 is open during this first mode of operation. Therefore, depending on the magnitude of the output 48 of the second difference amplifier the servo amplifier 28 is driven with either the output of the difference circuit 46 or the output of the differential generator 22.

Since the output of the presentation potentiometer 34 is zero, both the output 48 of the difference circuit 46 and the output of the differential generator 22 of the index servo are a measure of the difference between the position of the index servo and the position of the aircraft. Thus, the aircraft index servo 14 is positioned to follow the motion of the aircraft.

When the switch 18 is closed the aircraft presentation and index servos go into the external reference mode of operation. The index servo amplifier 28 is clamped to ground 64 preventing its further movement. Thus, the index shaft 26 has stored the distance the aircraft had moved from its starting position until the time the changing of the modes ($A_I$). Subtraction of this information from the fine 52 and coarse 42 aircraft position information A, respectively, in the differential generator 22 and the first difference circuit 40 provides fine and coarse information as to changes in the position of the aircraft from a new reference ($A-A_I$).

Subtraction of the presentation servos shaft's 36 position $A_P$ from this information in the control transformer 38 and the difference circuit 40 provides the fine-coarse relay 50 with the necessary information to properly position the presentation servo 12 to follow the motion of the aircraft around the selected reference point ($A-A_I=A_P$). To prevent the aircraft presentation voltage $A_P$ 66 during this mode from exceeding the limitations of the display equipment, the output of the first difference circuit is coupled to the relay amplifier 60, of conventional design and operation, so that the relay amplifier will uncouple the input 56 of the presentation servo 12 from the fine-coarse relay amplifier 50 and clamp it to ground 64 when the aircraft's distance from the selected reference ($A-A_I$) exceeds a pre-determined value. Thus the power from the servo motor is removed when the model of the aircraft reaches the edge of the operating area or when the presentation potentiometer reaches its limit.

The submarine presentation servo 16 contains a servo amplifier 68 driving a motor with a control transformer 72 on its shaft 74. The shaft 74 drives one input of a mechanical differential 76. The other input of the differential is the shaft 36 of the aircraft presentation servo 12. The output is coupled to a potentiometer 78.

Output signals of a fine-coarse relay amplifier 80, of conventional design and operation, are fed to the servo amplifier 68 by a second relay amplifier 82. The fine coarse relay permits the servo 16 to respond quickly to input signals while preventing the overshoot which is usually associated with high gain undamped servomechanisms. The second relay amplifier 82 of conventional design and operation, which operates in the same manner as relay-amplifier 60, prevents the output of the submarine presentation potentiometer from exceeding the limitations of the display equipment.

The input information into the submarine presentation servo is the position of the submarine relative to the aircraft (A-S). The fine channel 84 is fed to the control transformer 72 where it is subtracted from the shaft's position M and coupled to the relay amplifier 80 (the control transformer 72 is servoed as to make the electric input, A-S, equal to the mechanical input or shaft position M). The coarse information 86 is fed to a difference circuit 88 where the aircraft presentation potentiometer's output $A_P$ is subtracted from it. The resultant $(A-S)-A_P$ is then fed to a second difference circuit 90 along with the output of the submarine presentation potentiometer 78. The output of the second difference circuit $(A-S)-A_P-S_P$, is fed to the fine-coarse relay amplifier.

In operation when it is desirable to show the position of aircraft with respect to the submarine the switch 18 is opened and the position of the aircraft A with respect to some arbitrary reference is fed into the aircraft index servo 14. The aircraft index servo 14 follows up on the information positioning its shaft 26 to continually store the present position of the aircraft. The aircraft presentation servo follows up on the output of the aircraft presentation potentiometer 34 so that the output of the aircraft presentation potentiometer 34 is zero and the aircraft presentation shaft 36 is nulled.

As described above, the inventive principles are applied to one axis of a tracking presentation computer. Since other axes of such a computer would be the same as the one described, the principles described need only be duplicated for a presentation of more than one axis.

Obviously many modifications and variations of the present invention are possible in the light of the above teachings. It is therefore to be understood that within the scope of the appended claims the invention may be practiced otherwise than as specifically described.

For convenience, the above referred to terms are defined as follows;

$A$ = aircraft position
$S$ = submarine position
$A_I$ = aircraft index
$A_P$ = aircraft presentation (position of aircraft model)
$S_P$ = submarine presentation (position of submarine model)
$M$ = mechanical input.

Further, as defined "A" and "S" are the electrical information signals whose magnitudes are proportional to the position of, respectively, an aircraft and a submarine. Additionally, "$A_I$" is the electrical information signal whose magnitude is proportional to a reference position, in the first mode equal to "$A_P$," and in a second mode a fixed value, equal to the magnitude at which the output of the aircraft presentation servo is at, at the time the mode of operation changes from the first to the second mode.

In the first mode of operation, the fine and coarse inputs into the relay amplifier 80 of the submarine presentation will be, respectively, $(A-S)-M$ and $$(A-S)-A_P-S_P$$

Also in this first mode, $A_P$ will be zero, the aircraft presentation servo 12 having been nulled in this mode, and $A=A_I$. Thus the output of the submarine presentation potentiometer 78, $S_P$, in this first mode, will equal (S-A) for either the coarse or fine inputs to relay amplifier 80. Therefore, in the first mode, when the outputs of the submarine presentation potentiometer $S_P$ and the aircraft presentation potentiometer $A_P$ are presented on the face of an oscilloscope, the aircraft position, represented by $A_P$, would appear at the center of the scope, as in the first mode $A_P$ would be zero. The submarine's visual position would appear on the scope displaced from the center of the scope, at a distance proportional to (S-A), which is equal to the output of the submarine presentation potentiometer 78.

When it is desirable to present the position of both the aircraft and the submarine with respect to some outside index reference, the second mode of operation, the aircraft is initially positioned over the desired index reference point $A_I$, and then the switch 18 is closed to clamp the output of the index servo 14 at such reference point. This slaves the aircraft presentation servo 12 to any changes in the aircraft's position. The position of the aircraft presentation potentiometer 34, $A_P$, therefore equals $(A-A_I)$. The fine and coarse inputs to the submarine's relay amplifier 80 are the same in this second mode as they were in the first mode, $(A-S)-M$ being the fine input, and $(A-S)-A_P-S_P$ for the coarse input. However, as the output of the aircraft presentation servo 12, $A_P$, is no longer zero, but instead is equal to $(A-A_I)$ and $M=A-S$ the submarine's presentation servo output 78, $S_P$, will now equal $A_I-S$, $(A-A_I)$ and $A-S$ being substituted for $A_P$ and M, respectively, in the equation $S_P=A_P-M$, M and $A_P$ being the two inputs to the mechanical differential, which drives the submarine presentation potentiometer 78. Since $A_P = A - A_I$, and $S_P = S - A_I$, a scope presentation would show, both the $A_P$ and $S_P$ signals displaced from the center of the tube ($A_I$), and moving with respect to this index reference point, and to each other.

What I claim is:

1. A navigation presentation computer which when supplied with information concerning the position of an aircraft and the position of an aircraft with respect to a submarine will provide an output proportional to the position of the aircraft with respect to the submarine or the position of both the aircraft and the submarine with respect to some external reference comprising:

a servo index means providing an output proportional to the information concerning the position of the aircraft where the output may be stopped at any one moment to provide thereafter an output proportional to the position of the aircraft at that moment;

a first presentation servo means providing an output proportional to the difference between the output of said servo index means and the information concerning the position of the aircraft;

means for coupling said information concerning the position of an aircraft to said servo index means and to said first presentation servo means;

means for coupling said servo index means to said first presentation servo means;

a second presentation servo means providing an output proportional to the difference between the output of the servo index means and the information concerning the position of the submarine;

means for coupling said information concerning the position of an aircraft with respect to a submarine to said second presentation servo means;

and means for coupling said first presentation servo means to said second presentation servo means.

2. A navigation presentation computer which when supplied with information concerning the position of a first object and the position of a first object with respect to a second object will provide an output proportional to the position of the first object with respect to the second object or the positions of both the first object and the second object with respect to some external reference comprising:

a servo index means providing an output proportional to the information concerning the position of the first object where the output may be stopped at any one moment to provide thereafter an output proportional to the position of the first object at that moment;

a first presentation servo means providing an output proportional to the difference between the output of said servo index means and the information concerning the position of the first object;

means for coupling said information concerning the position of the first object to said servo index means and to said first presentation servo means;

means for coupling said servo index means to said first presentation servo means;

a second presentation servo means providing an output proportional to the difference between the output of the servo index means and the information concerning the position of the second object;

means for coupling said information concerning the position of the first object with respect to the second object, to said second presentation servo means;

and means for coupling said first presentation servo means to said second presentation servo means.

3. A computer operable in either a first or second mode, supplied with information concerning the position of a first object and the position of the first object with respect to a second object comprising:

reference servo means for providing an output proportional to the position information of the first object in the first mode, and for providing in the second mode a reference output proportional to the position information of the first object at the moment the mode of operation is changed from the first mode to the second mode;

first object servo means for providing an output, in both modes, proportional to the difference between the position information of the first object and the output of said reference servo means;

means for coupling said position information of the first object to said reference servo means and to said first object servo means;

means for coupling said reference servo means to said first object servo means;

second object servo means, in both modes, for providing an output proportional to the difference between the position information of the second object and the output of the reference servo means;

means for coupling said position information of the first object with respect to the second object to said second object servo means;

and means for coupling said first object servo means to said second object servo means.

4. A computer operable in either a first or second mode, supplied with information concerning the position of an aircraft and the position of the aircraft with respect to a submarine comprising:

reference servo means for providing an output proportional to the position information of the aircraft in the first mode, and for providing in the second mode a reference output proportional to the position information of the aircraft at the moment the mode of operation is changed from the first mode to the second mode;

an aircraft servo means for providing an output, in both modes, proportional to the difference between the position information of the aircraft and the output of said reference servo means;

means for coupling said position information of the aircraft to said reference servo means and to said aircraft servo means;

means for coupling said reference servo means to said aircraft servo means;

submarine servo means, in both modes, for providing an output proportional to the difference between the position information of submarine and the output of the reference servo means;

means for coupling said position information of the aircraft with respect to the submarine to said submarine servo means;

and means for coupling said aircraft servo means to said submarine servo means.

5. A computer operable in either a first or second mode, supplied with information concerning the position of a first object and the position of the first object with respect to a second comprising:

reference servo means for providing an output proportional to the position information of the first object in the first mode, and for providing in the second mode a reference output proportional to the position information of the first object at the moment the mode of operation is changed from the first mode to the second mode;

first object servo means for providing an output, in both modes, proportional to the difference between the position information of the first object and the output of said reference servo means;

first switching means coupled to said reference servo means and to said first object servo means for providing fine-coarse adjustment of both said servo means;

means for coupling said position information of the first object to said first switching means, second object servo means in both modes, for providing an output proportional to the difference between the position information of the second object and the output of the reference servo means;

second switching means coupled to said second object servo means and said first object servo means for providing fine-coarse adjustment of said second object servo means;

means for coupling said position information of the first object with respect to the second object to said second switching means;

and means for coupling said first object servo means to said second object servo means.

6. A computer operable in either a first or second mode, supplied with information concerning the position of a first object and the position of the first object with respect to a second comprising:

reference servo means for providing an output proportional to the position information of the first object in the first mode, and for providing in the second mode a reference output proportional to the position information of the first object at the moment the mode of operation is changed from the first mode to the second mode;

first object servo means for providing an output in both modes, proportional to the difference between the position information of the first object and the output of said reference servo means;

first switching means for providing fine-coarse adjustment of both said first object servo means and said reference servo means;

means for coupling said position information of the first object to said first switching means;

first connecting means for coupling the output of said first switching means to the input of said reference servo means;

second connecting means for coupling said first connecting means to the input of said first object servo means;

third connecting means coupling the output of said first object servo means to said first switching means;

second object servo means, in both modes, for providing an output proportional to the difference between the position information of the second object and the output of the reference servo means;

second switching means for providing fine-coarse adjustment of said second object servo means;

fourth connecting means coupling the output of said first object servo means to said second switching means and to said second object servo means;

means for coupling said position information of the first object with reference to the second object to second switching means;

and fifth connecting means coupling the output of said second switching means to the input of said second object servo means.

7. The device as set forth in claim 6 including,
means coupled to the first, second and fourth connecting means for selecting the mode of operation.

8. The device as set forth in claim 6 including,
means coupled to the first, second and fourth connecting means, for selecting the mode of operation, wherein said selecting means during the first mode of operation disconnects the second connecting means from the input of the first object servo means and connects together the output and input of the first object servo means, said selecting means during the second mode of operation disconnecting the first connecting means from the first object servo means.

9. The device as set forth in claim 6 including,
sixth connecting means coupling the output of said second object servo means to the input of said second object servo means during the first mode of operation to thereby place said second object servo means in a follow-up condition of operation whereby the output of said second object servo means is nulled.

10. The device as set forth in claim 9 including,
seventh connecting means coupling the output of said second object servo means to said second switching means.

11. The device as set forth in claim 9 including,
eighth connecting means coupling the output of said first object servo means to said first switching means.

12. The device as set forth in claim 6 including:
sixth connecting means coupling the output of said second object servo means to the input of said second object servo means during the first mode of operation to thereby place said second object servo means in a follow-up condition of operation whereby the output of said second object servo means is nulled;

seventh connecting means coupling the output of said second object servo means to said second switching means;

eighth connecting means coupling the output of said first object servo means to said first switching means;

means for providing fine-coarse adjustment of each of said servo means when supplied with fine and coarse information comprising, position determining means coupled to the output of said servo means, comparison means coupled to said position determining means, first means for coupling said fine information to said comparison means, subtraction means coupled to the output of said servo means, second means coupling said coarse information to said subtraction means.

relay switching means coupled to said subtraction means, and said comparison means, and having its output coupled to the input of said servo means.

References Cited by the Examiner

UNITED STATES PATENTS

| | | | |
|---|---|---|---|
| 2,530,428 | 11/50 | Gray | 235—187 |
| 2,541,277 | 2/51 | Omberg et al. | 235—187 |
| 2,614,237 | 10/52 | Goertz | 318—30 |
| 2,689,083 | 9/54 | Hammond | 235—61.5 |
| 2,737,652 | 3/56 | White et al. | 235—61.5 |
| 2,751,535 | 6/56 | Kuhmel | 318—19 |
| 2,798,992 | 7/57 | Adler et al. | 318—19 |
| 2,844,313 | 7/58 | Seliger | 235—187 |
| 2,959,779 | 11/60 | Miller et al. | 235—61 |
| 2,991,011 | 7/61 | Shuck | 235—187 |
| 2,995,739 | 8/61 | Mannheimer | 235—187 X |

MALCOLM A. MORRISON, *Primary Examiner.*

CORNELIUS D. ANGEL, *Examiner.*